(12) United States Patent
Lake

(10) Patent No.: US 6,717,764 B2
(45) Date of Patent: Apr. 6, 2004

(54) METHOD AND APPARATUS FOR HEAD FLY HEIGHT MEASUREMENT

(75) Inventor: Jeffrey H. Lake, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 325 days.

(21) Appl. No.: 09/870,028

(22) Filed: May 30, 2001

(65) Prior Publication Data

US 2002/0001151 A1 Jan. 3, 2002

Related U.S. Application Data

(60) Provisional application No. 60/209,036, filed on Jun. 2, 2000.

(51) Int. Cl.[7] .............................................. G11B 21/02
(52) U.S. Cl. ........................................................ 360/75
(58) Field of Search ............................. 360/75, 60, 70, 360/31

(56) References Cited

U.S. PATENT DOCUMENTS

| | | | |
|---|---|---|---|
| 4,532,802 A | 8/1985 | Yeack-Scranton et al. .... 73/432 R | |
| 4,605,977 A | 8/1986 | Matthews ................... 360/103 | |
| 4,681,447 A | 7/1987 | Davidson .................... 356/351 | |
| 4,777,544 A | 10/1988 | Brown et al. ................. 360/75 | |
| 4,931,887 A * | 6/1990 | Hegde et al. ................. 360/75 | |
| 5,068,754 A | 11/1991 | Garde ......................... 360/45 | |
| 5,168,413 A | 12/1992 | Coker et al. ................ 360/137 | |
| 5,377,058 A | 12/1994 | Good et al. ................... 360/75 | |
| 5,457,534 A | 10/1995 | Lacey et al. ................ 356/357 | |
| 5,473,431 A | 12/1995 | Hollars et al. .............. 356/355 | |
| 5,475,488 A | 12/1995 | Fukuzawa et al. .......... 356/357 | |
| 5,719,677 A | 2/1998 | Guerra ....................... 356/375 | |
| 5,757,492 A | 5/1998 | Tokutomi et al. ........... 356/357 | |
| 5,831,781 A | 11/1998 | Okamura ..................... 360/31 | |
| 5,863,237 A * | 1/1999 | Felts et al. .................... 451/41 | |
| 6,021,666 A * | 2/2000 | Yao et al. ..................... 73/105 | |
| 6,041,394 A | 3/2000 | Halligan et al. ............ 711/166 | |
| 6,057,975 A | 5/2000 | Yaeger et al. ................ 360/75 | |
| 6,104,561 A | 8/2000 | Braithwaite et al. .......... 360/60 | |
| 6,314,814 B1 * | 11/2001 | Brannon et al. .............. 73/705 | |
| 6,317,210 B1 * | 11/2001 | Wen et al. ................... 356/638 | |
| 6,369,900 B1 * | 4/2002 | Sundaram et al. .......... 356/614 | |
| 6,408,677 B1 * | 6/2002 | Suzuki ........................ 73/1.89 | |
| 6,570,730 B1 * | 5/2003 | Lewis et al. .................. 360/75 | |

* cited by examiner

Primary Examiner—David Hudspeth
Assistant Examiner—Fred F. Tzeng
(74) Attorney, Agent, or Firm—Westman, Champlin & Kelly

(57) ABSTRACT

A system for measuring fly height of a head over a rotatable magnetic disc having a disc surface on which data is digitally stored is provided. Data is digitally stored on the disc surface by selectively polarizing portions of the disc surface into at least a first magnetic state or a second magnetic state. A read back circuit is coupled to the head. The read back circuit generates an electrical read back signal in response to the head encountering a transition between magnetic states. The system for measuring fly height includes a measurement circuit coupled to the head read back circuit to measure pulse width and amplitude of the read back signal. A calculation circuit coupled to the measurement circuit determines the fly height of the head based on the measured pulse width and amplitude of the read back signal. In addition, a method of measuring the fly height of a head by using a read back signal in a disc drive storage system is provided.

20 Claims, 7 Drawing Sheets

METHOD AND APPARATUS FOR HEAD FLY HEIGHT MEASUREMENT

CROSS-REFERENCE TO RELATED APPLICATION

This application claims priority to U.S. Provisional Application No. 60/209,036, filed Jun. 2, 2000 and entitled "MAGNETIC DISC DRIVE HEAD FLY HEIGHT MEASUREMENT".

FIELD OF THE INVENTION

The present invention relates to data storage systems and, in particular, to a method and apparatus for measuring the fly height of a head used in a disc storage system.

BACKGROUND OF THE INVENTION

Disc storage systems are known in the art and are used to store information for later retrieval. Such disc storage systems include a rotating disc which carries information thereon. A transducing head (or, in some instances, a read back head) is positioned over a surface of the disc while the disc rotates at high speed. The head is carried on a slider which is designed to "fly" just over the surface of the rotating disc. The head may then be used to write information onto the disc or read information from the disc. Such information may be, for example, magnetically or optically encoded on the disc surface.

Increased storage density is becoming increasingly important. One technique known to increase storage density is to decrease the "fly height" of the head. Fly height is defined as the distance between the disc surface and the head or slider during operation of the storage system. A reduced fly height allows information to be written or read back more precisely and such information can be stored in a smaller area (i.e., at a higher density).

Various techniques have been used in the art to measure the fly height of the head. For example, if a disc is designed to operate with a certain fly height, typically, this fly height must be measured in order to ensure that the system is operating within specification. Commonly, the fly height is measured before assembling the head and slider assemblies into disc drives. One technique to measure fly height is by measuring electrical capacitance between the head and the disc. Another common technique to measure fly height is using optical interferometry in which a transparent test disc is used to fly the slider. Light is shined through the disc onto the slider from a source on the other side of the disc. Using known techniques, the reflected light can be examined to determine fly height. U.S. Pat. No. 5,280,340, issued Jan. 18, 1994 to Lacy describes a number of such techniques for measuring fly height. Prior art techniques have also used the amplitude of the read back signal provided by a read back circuit coupled to the head to measure head fly height.

Disadvantages of the above and other known apparatus include long measurement times and the need for additional electromechanical hardware. In addition, fly height measurement systems using only the amplitude of the read back signal to measure fly height have a sensitivity that is too low for precise high speed true fly height dynamic measurements.

The present invention addresses these problems, and offers other advantages over the prior art.

SUMMARY OF THE INVENTION

Embodiments of the present invention relate to a fly height measurement scheme that utilizes a read back signal amplitude and pulse width to determine head fly height, thereby addressing the above-mentioned problems.

A system for measuring fly height of a head over a rotatable magnetic disc having a disc surface on which data is digitally stored is provided. Data is digitally stored on the disc surface by selectively polarizing portions of the disc surface into at least a first magnetic state or a second magnetic state. A read back circuit is coupled to the head. The read back circuit generates an electrical read back signal in response to the head encountering a transition between magnetic states. The system for measuring fly height includes a measurement circuit coupled to the head read back circuit to measure pulse width and amplitude of the read back signal. A calculation circuit coupled to the measurement circuit determines the fly height of the head based on the measured pulse width and amplitude of the read back signal. In addition, a method of measuring the fly height of a head by using a read back signal in a disc drive storage system is provided.

These and various other features as well as advantages which characterize the present invention will be apparent upon reading of the following detailed description and review of the associated drawings.

BRIEF DESCRIPTION OF THE DRAWINGS

FIGS. 2-1 through 2-11 illustrate the concept on which fly height measurement in accordance with an embodiment of the present invention is based.

FIG. 3 illustrates a comparison between a prior art fly height measurement system using optical interferometry and a fly height measurement system in accordance with an embodiment of the present invention.

FIG. 4 illustrates a fly height measurement system in accordance with one embodiment of the present invention.

DETAILED DESCRIPTION OF ILLUSTRATIVE EMBODIMENTS

Figure 1:
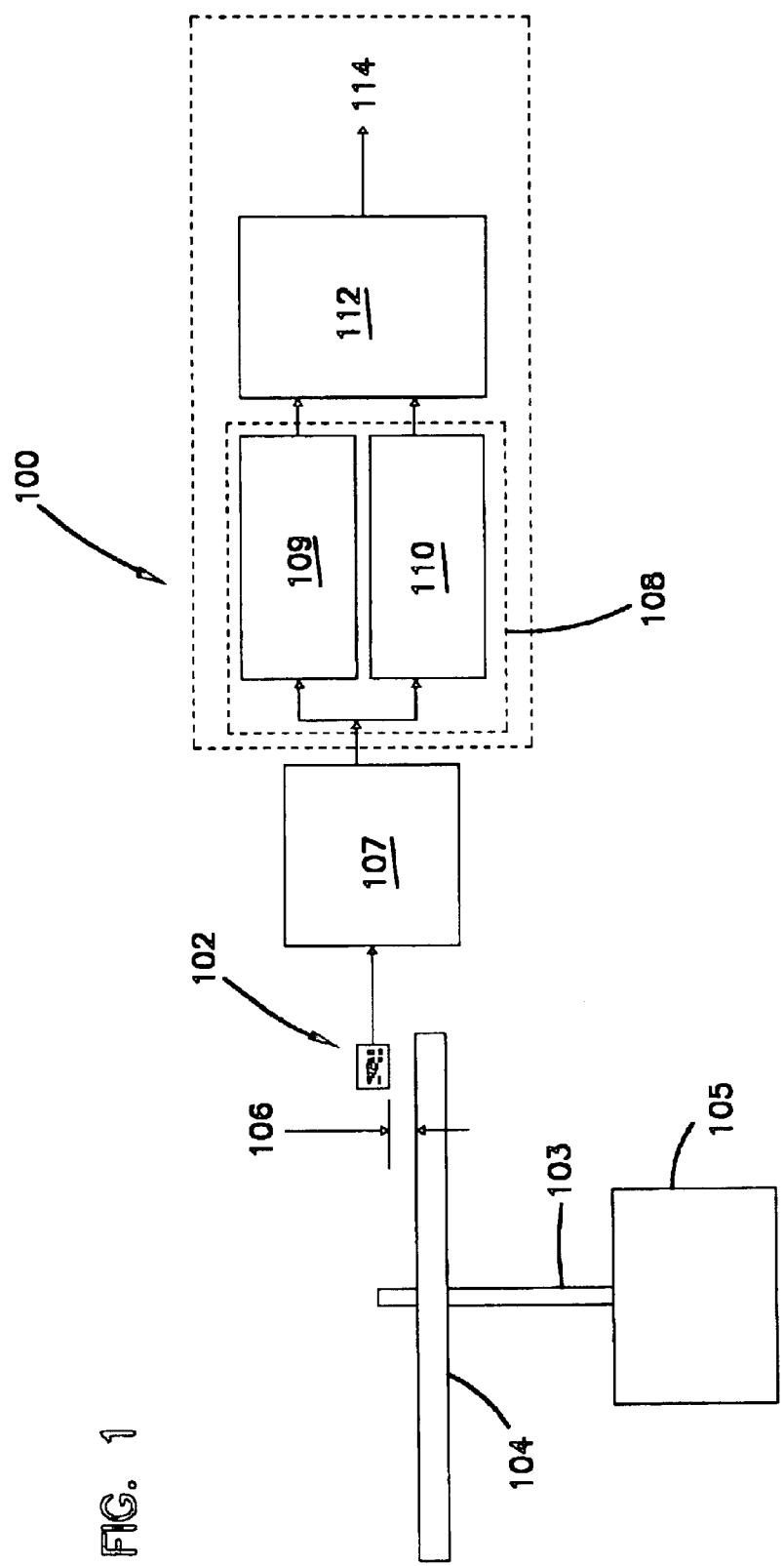
FIG. 1 is a simplified block diagram of a fly height measurement system in accordance with an embodiment of the present invention.

Referring now to FIG. 1, a simplified block diagram of a fly height measurement system 100 in accordance with an embodiment of the present invention is shown. Fly height measurement system 100 is electrically coupled to head 102 which is positioned near the surface of disc 104. Disc 104 is mounted about spindle 103, which is coupled to spindle motor 105 such that energization of spindle motor 105 causes spindle 103 and disc 104 to rotate. The surface of disc 104 includes information that is digitally stored by selectively polarizing portions of the disc surface into at least a first magnetic state or a second magnetic state. Head 102 is coupled to a read back circuit (not shown) that generates an electrical read back signal in response to the head 102 encountering a data transition (a transition between magnetic states). A preamplifier 107 is included in the electrical path connecting head 102 to measurement system 100. Preamplifier 107 amplifies the read back signal from the read back circuit. This amplified read back signal is used by measurement system 100 to determine fly height 106 of head 102 above the surface of disc 104.

Fly height measurement system 100 includes measurement circuit 108 and fly height calculation circuit 112 which together provide measured fly height 106 at output port 114. Measurement circuit 108 includes pulse width measurement circuit 109 and amplitude measurement circuit 110. The amplified read back signal from preamplifier 107 is fed to both pulse width measurement circuit 109 and amplitude measurement circuit 110. Circuits 109 and 110 respectively measure the pulse width and amplitude of the read back signal. The outputs of circuits 109 and 110 are fed to fly height calculation circuit 112 which calculates the fly height 106 based on the pulse width and amplitude measurements and provides the resulting fly height measurement at output port 114.

Figures 1, 2:
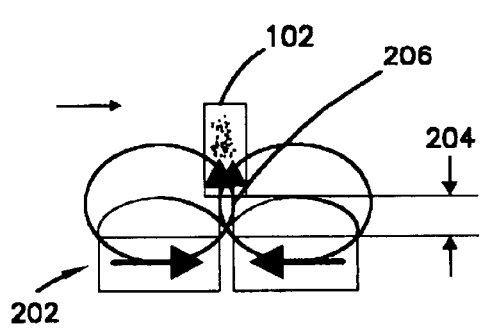
Figure 2:
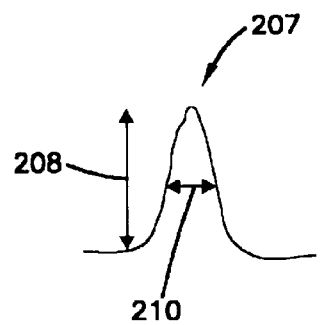

Referring now to FIGS. 2-1 through 2-11, one basis for fly height 106 measurement in accordance with an embodiment of the present invention is illustrated. FIG. 2-1 shows head 102 positioned above data transition 202 at fly height 204 ("FH"). In response to moving over magnetic field lines 206 at transition 202, head 102 produces a read back signal 207 shown in FIG. 2-2. Read back signal 207 has an amplitude 208 and a pulse width 210 (PW50) measured half way along amplitude 208.

Figures 2, 3:
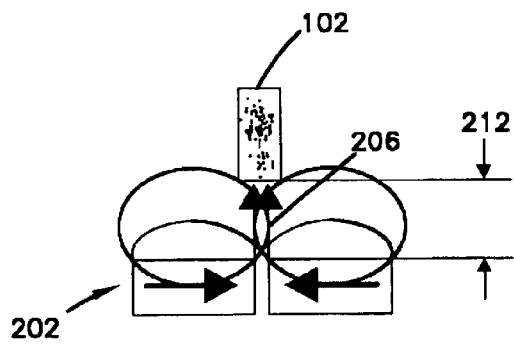

FIG. 2-3 shows head 102 over data transition 202 at fly height 212 that is greater than fly height 204 shown in FIG. 2-1. At greater fly heights magnetic field lines 206 have lower intensity near data transition 202. Consequently, a lower amplitude read back signal 213 (FIG. 2-4) is produced. However, at greater fly heights, the pulse width of the read back signal increases. Read back signal 213 has an amplitude 214 that is less than amplitude 208 of read back signal 207 (FIG. 2-2), whereas pulse width 216 of signal 213 is greater than pulse width 210 of read back signal 207.

FIG. 2-5 shows head 102 over data transition 202 at fly height 218 that is less than fly height 204 shown in FIG. 2-1. At lower fly heights magnetic field lines 206 have increased intensity near data transition 202. Consequently, a higher amplitude read back signal 219 (FIG. 2-6) is produced. However, at lower fly heights, the pulse width of the signal decreases. Read back signal 219 has an amplitude 220 that is greater than amplitude 208 of read back signal 207 (FIG. 2-2), whereas pulse width 222 of signal 219 is less than pulse width 210 of read back signal 207.

FIG. 2-7 is a plot 224 of amplitude variation of the read back signal along axis 226 as a function of fly height along axis 228. Resultant plot 224 demonstrates that the amplitude of the read back signal is inversely proportional to the fly height. At nominal fly height 232 ($FH_{nom}$) shown along axis 228 the corresponding nominal amplitude 230 ($Amp_{nom}$) is shown along axis 226.

FIG. 2-8 is a plot 234 of variation of pulse width (PW50) of the read back signal along axis 236 as a function of fly height along axis 228. Plot 234 demonstrates that the pulse width of the read back signal is directly proportional to the fly height. At $FH_{nom}$ 232 shown along axis 228 the corresponding nominal pulse width 238 ($PW50_{nom}$) is shown along axis 236.

In typical disc drives that employ multiple discs contained in a housing, variations of air pressure within the housing cause corresponding variations in fly height. Consequently, an increase or decrease in air pressure within the disc drive causes a corresponding increase or decrease in fly height. FIG. 2-9 includes plots showing variations of fly height 242 in micro inches ($\mu$inches) as a function of pressure 240 in toroids (torr). Plot 244 illustrates fly height vs. pressure when heads are positioned at the inner diameter of the discs and plot 246 illustrates fly height vs. pressure when the heads are positioned at the outer diameter of the discs. Also, if a drive is used at too high an altitude, the air becomes too thin to support the heads at a desired operating height. FIG. 2-10 is a plot 252 of altitude 250 in feet vs. pressure 248 in torr which shows the inverse relationship of pressure and altitude.

FIG. 2-11 illustrates plots 258 which represent test results showing variation of PW 256 in nanoseconds as a function of pressure 254 in torr. Each plot 258 represents a different head in the disc drive. Plots 258 indicate empirically that the pulse width is proportional to the pressure. Because the heads fly on the air mass, fly height is directly proportional to pressure. Thus, both PW and fly height are directly proportional to pressure.

The read back signal relationship between fly height and amplitude and fly height and pulse width is used to derive a fly height calculation in accordance with an embodiment of the present invention.

$$FH \propto PW50_{measured} \quad \text{EQ. 1}$$

$$FH \propto \frac{1}{Amplitude_{measured}}$$

$$FH \propto \frac{PW50_{measured}}{Amplitude_{measured}}$$

$$FH = K_{nom} \frac{PW50_{measured}}{Amplitude_{measured}}$$

$K_{nom}$ is a constant computed at a nominal fly height.

Referring now to FIGS. 3-1 and 3-2, a comparison between a prior art fly height measurement system using optical interferometry and a fly height measurement system in accordance with an embodiment of the present invention is shown. The prior art system of FIG. 3-1 measures fly height 302 in $\mu$ inches 300 with the use of a test glass disc 304.

The test glass disc 304 is necessary in order to direct a light beam toward the head in accordance with well known optical interferometry practice. In contrast, the fly height measurement system in FIG. 3-2 measures fly height 302 using magnetic medium 306, such as that which is used in the disc drive. Therefore, embodiments of the present invention can be practiced with the discs in a disc drive. This eliminates the need for extraneous test equipment associated with prior art solutions, such as the glass disc 304 and light source necessary in optical interferometry.

Figures 2, 3, 4:
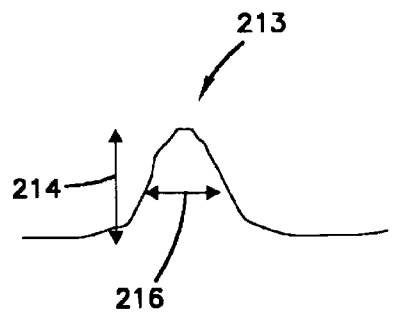
Figures 2, 3, 4, 5:
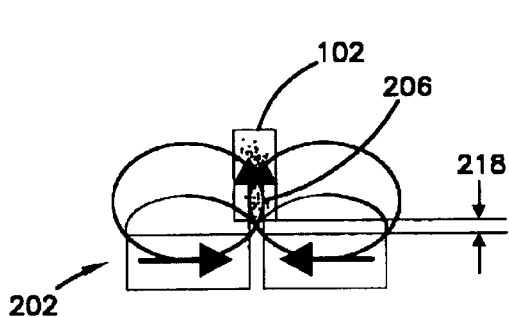
Figures 2, 3, 4, 5, 6:
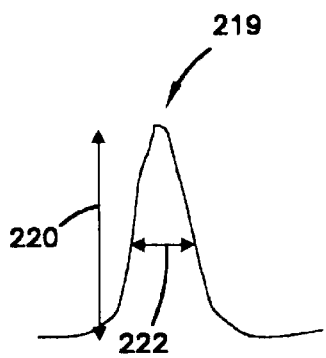
Figures 2, 3, 4, 5, 6, 7:
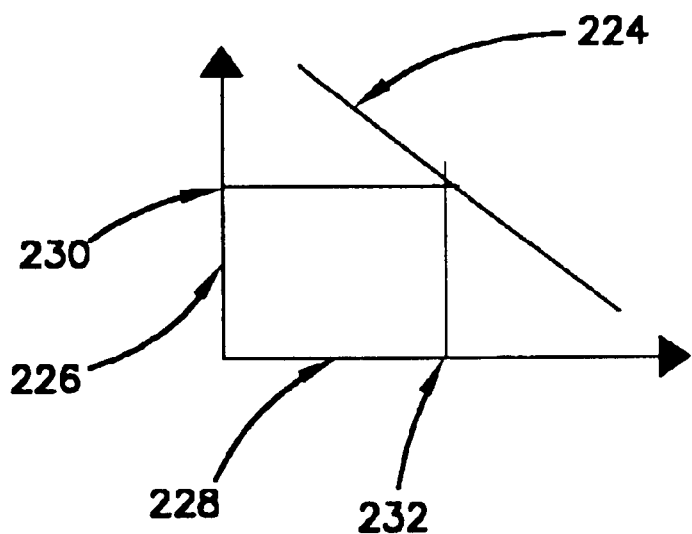
Figures 2, 3, 4, 5, 6, 7, 8:
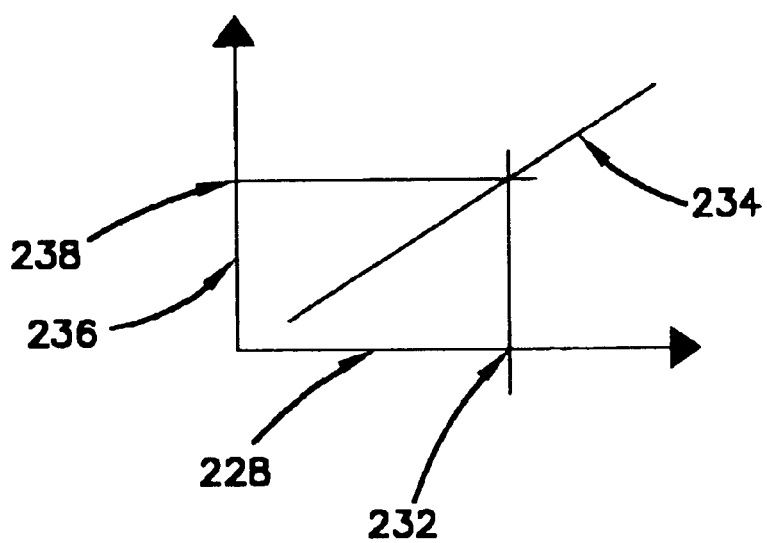
Figures 2, 3, 4, 5, 6, 7, 8, 9, 10:
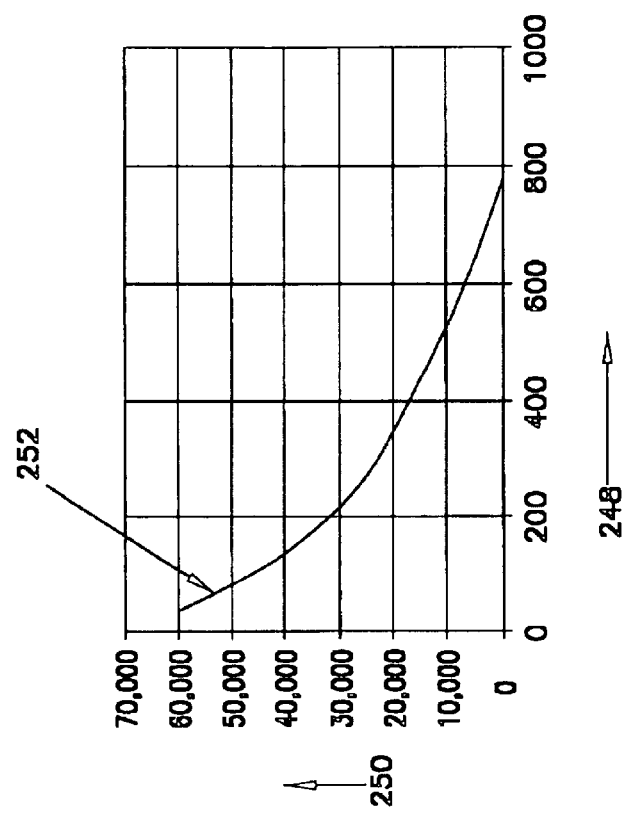
Figures 2, 3, 4, 5, 6, 7, 8, 9:
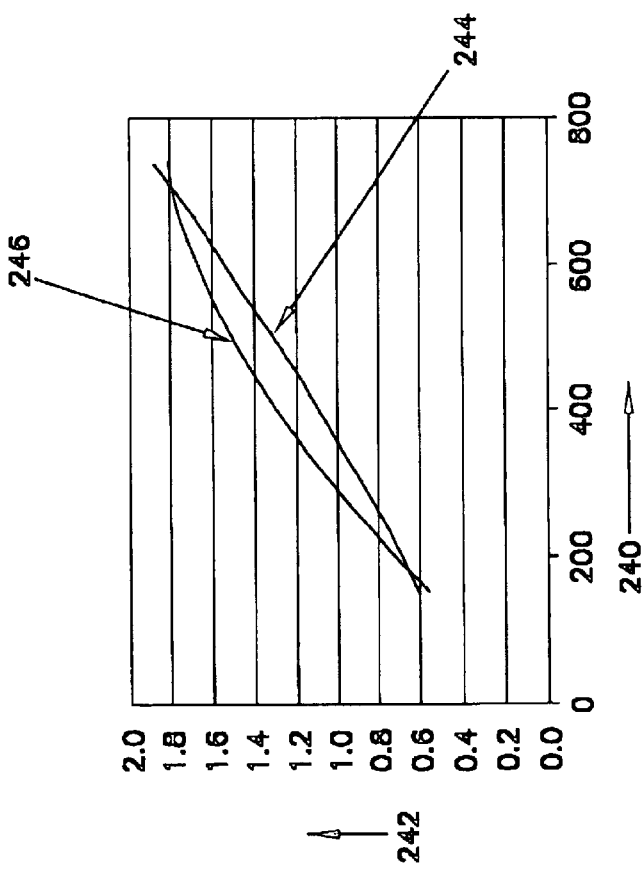
Figures 2, 3, 4, 5, 6, 7, 8, 9, 10, 11:
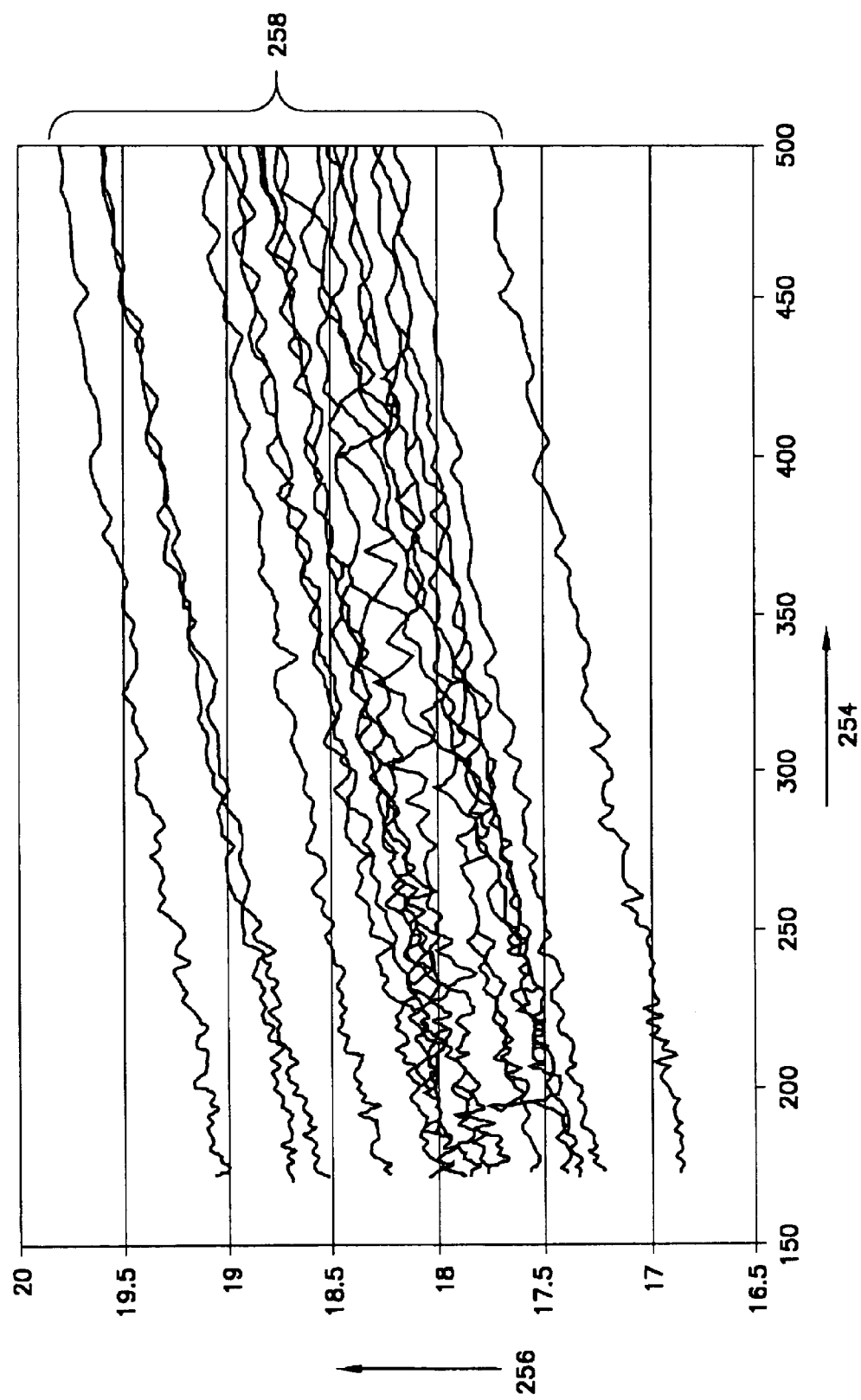
Figures 1, 3:
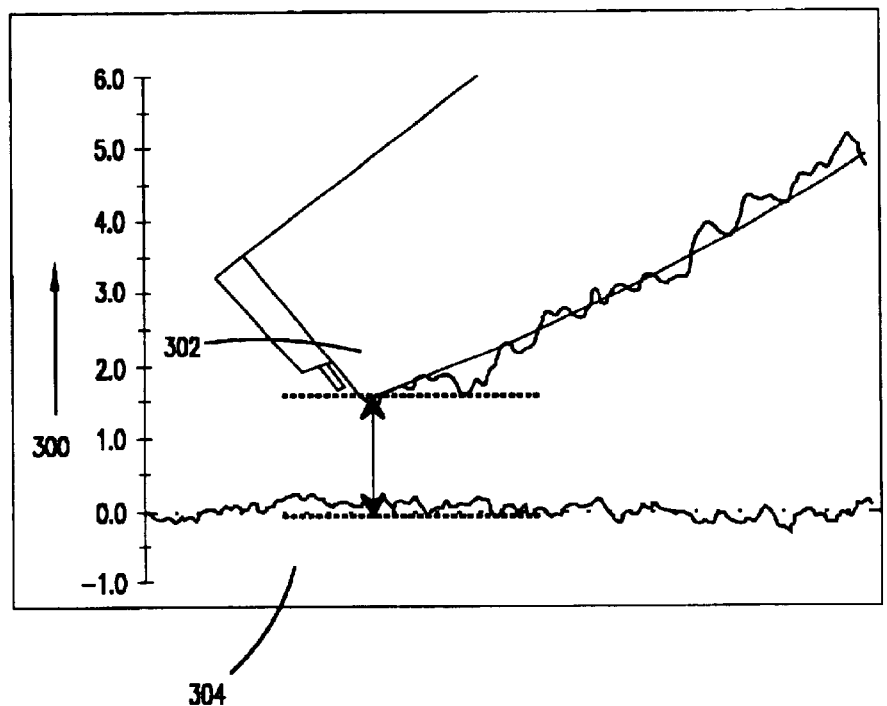
Figures 2, 3:
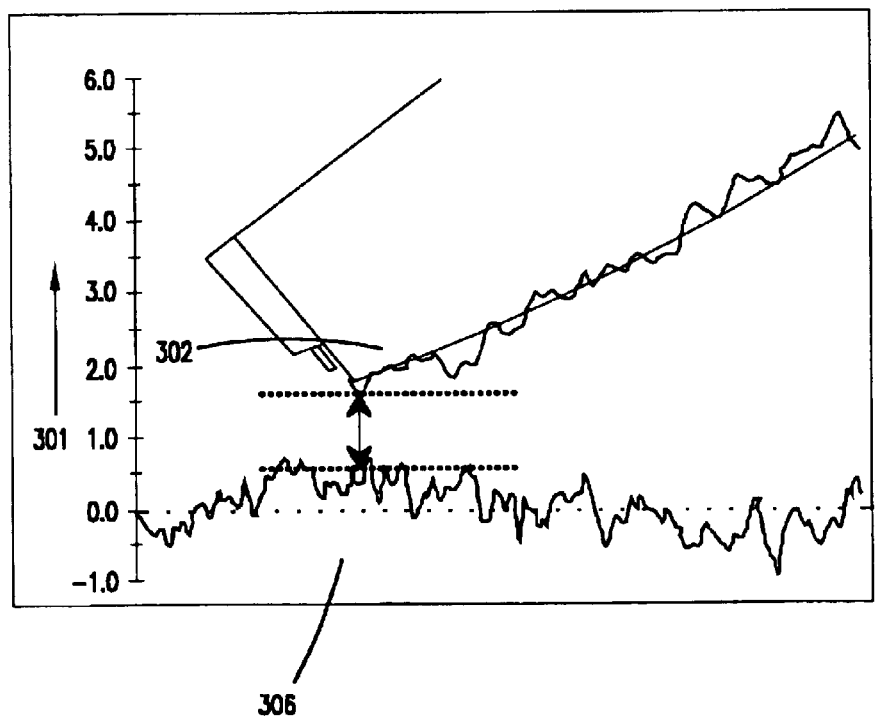
Figure 4:
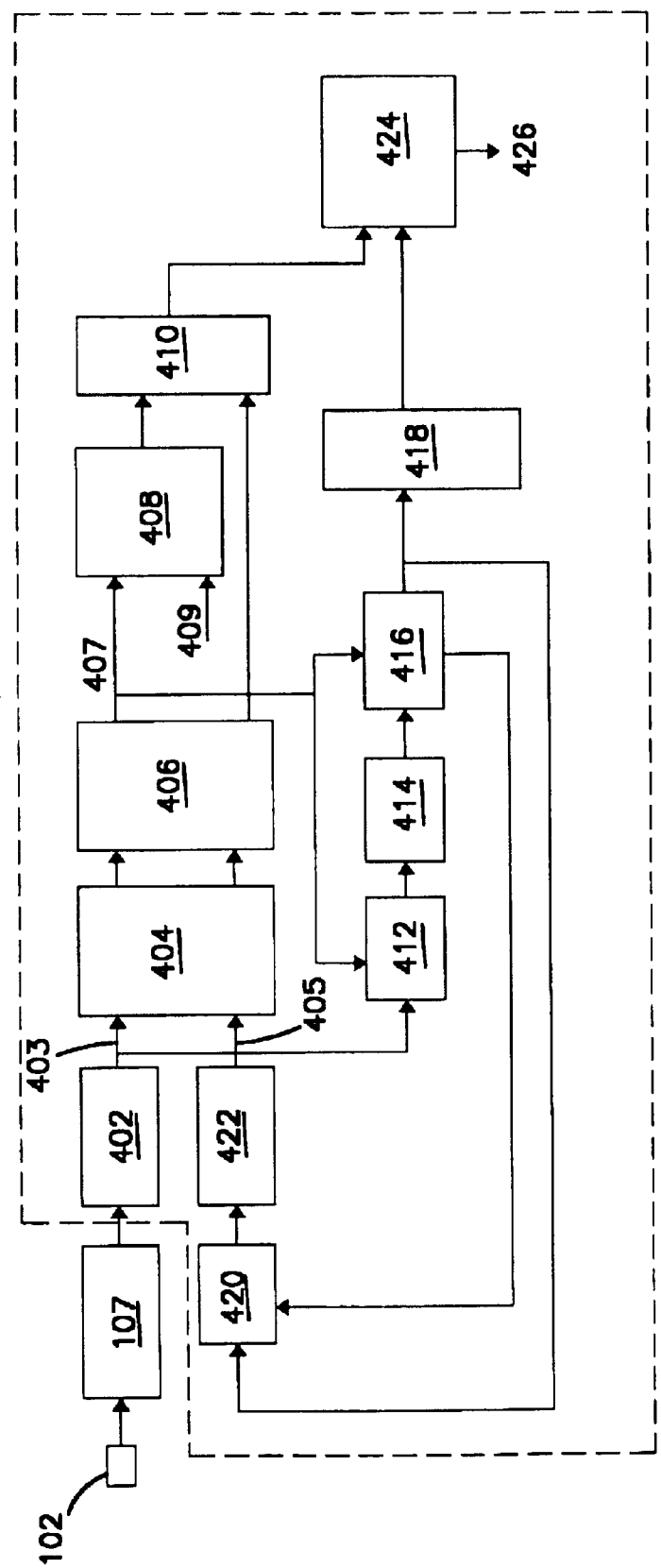

Referring now to FIG. 4, a detailed embodiment of a fly height measurement system 400 in accordance with an embodiment of the present invention is shown. An amplified read back signal from preamplifier 107 is used by measurement system 400 to determine the fly height of head 102 above the surface of the disc 104 (FIG. 1). Fly height measurement system 400 includes differential to single ended amplifier 402 which converts an amplified differential read back signal received from preamplifier 107 to a single ended read back signal. The single ended read back signal is fed to a first input 403 of analog comparator 404. Comparator 404 compares this first input 403 to a reference level provided at a second input 405. The reference level is an analog signal level scaled to represent 50% of the peak amplitude of a reference signal. The reference signal may be, for example, an average of the previously acquired peak amplitude levels of the first input 403 or the peak value of the previous first input 403. Analog comparator 404 generates a logical 0 to 1 level transition at a point in time when the first input 403 is equal to or greater than the reference level. Comparator 404 is coupled to input 407 of digital counter 408 via a comparator latch 406. When the output of comparator 404 is at a logic 1, digital counter 408 is enabled at input 407 to increment its binary count for each input clock transition at input 409. The counter 408 continues to increment its binary count until the comparator output and corresponding enable count input 407 switches to a logic 0 when the first input 403 drops below the reference level. Data buffer 410 temporarily holds output data from both counter 408 and comparator latch 406 at the end of the count. The binary count of counter 408 times the constant clock time period is equal to the pulse width duration PW. PW may be calculated by digital signal processor (DSP) 424 or by a separate processor (not shown) and then fed to DSP 424.

The peak amplitude of the read back signal is found by sampling the first input 403 in sample-hold circuit 412 when digital counter 408 is enabled at input 407 by comparator 404 generating a logic 1. Peak detector 414 coupled to sample-hold circuit 412 finds the peak amplitude and holds the signal stable at the input of analog to digital (A/D) converter 416. A/D converter 416 performs its conversion when enable count input 407 switches back to a logic 0. The peak amplitude binary data is temporarily stored in buffer 418 before being used by DSP 424 to calculate head fly height based on the peak amplitude and pulse width PW50. DSP 424 provides measured fly height at output port 426. Output for A/D converter 416 and the point in time when the conversion is complete is fed back to second input 405 of converter 404 via data buffer 420 and D/A converter 422 to provide an analog reference level for comparison with a next first input 403.

Individual circuit elements of measurement system 400 can be changed without substantially modifying the functionality of the system. For example, digital counter 408 can be replaced by a time to voltage conversion circuit using a precision current source that charges a capacitor to measure amplitude.

The present invention can be summarized in reference to the figures, which illustrate systems for measuring fly height (100, 400) in accordance with embodiments of the present invention. The fly height calculation system (100, 400) is for measuring fly height of a head 102 over a rotatable disc 104 having a disc surface on which data is digitally stored by selectively polarizing portions of the disc surface into at least a first magnetic state or a second magnetic state. A read back circuit is coupled to head 102. The read back circuit generates an electrical readback signal which contains pulses in response to head 102 encountering a transition 202 between magnetic states. Fly height measurement system (100,400) includes measurement circuit 108 electrically operably coupled to the read back circuit and configured to measure a pulse width and an amplitude of the read back signal. The system also includes calculation circuit 112 electrically operably coupled to measurement circuit 108. Calculation circuit 112 determines the fly height of the head based on the measured pulse width and amplitude of the read back signal.

In some embodiments of the present invention, measurement circuit 108 includes pulse width measurement circuit 109 that measures the pulse width of the readback signal and amplitude measurement circuit 110 that measures the amplitude of the readback circuit. In some embodiments, the pulse width is measured at half a peak amplitude of the readback signal. In some embodiments, the relationship between the fly height and the pulse width is substantially linear.

In some embodiments, the fly height is calculated according to the equation:

$$FH = K_{nom} \frac{PW50_{measured}}{\text{Amplitude}_{measured}}$$

where $PW50_{measured}$ is the pulse width of the read back signal measured by measurement circuit 108, $\text{Amplitude}_{measured}$ is the amplitude of the read back signal measured by measurement circuit 108, $K_{nom}$ is a constant computed at a nominal fly height and FH is the fly height of the head calculated by calculation circuit 112.

In some embodiments of the present invention, measurement circuit 108 includes a comparator 404 that compares the read back signal to a reference level, the reference level being a threshold at which the pulse width of the read back signal is to be measured. In some embodiments, measurement circuit 108 includes a counter 408 that increments a count at a constant clock time period when the read back signal is above a reference level. In some embodiments, the pulse width is a product of the count and the constant clock time period.

In some embodiments of the present invention, measurement circuit 108 includes a sample-hold circuit 412 that provides a sampled read back signal. In some embodiments, measurement circuit 108 includes a peak detector 414 that holds a peak amplitude value from the sampled read back signal. In some embodiments calculation circuit 112 includes a DSP processor 424.

Embodiments of the present invention include a method of measuring fly height of a head 102 over a rotatable magnetic disc 104 having a disc surface on which data is digitally stored by selectively polarizing portions of the disc surface into at least a first magnetic state or a second magnetic state. A read back circuit is coupled to head 102. The read back circuit generates an electrical read back signal which contains pulses in response to head 102 encountering a transition between magnetic states. The method includes measuring a pulse width and an amplitude of the read back signal and calculating the fly height of head 102 based on the measured pulse width and amplitude of the read back signal.

In some embodiments of the present invention, measuring the pulse is carried out with pulse width measurement circuit 109 and measuring the amplitude is carried out with amplitude measurement circuit 110. In some embodiments, the pulse width is measured at half a peak amplitude of the read back signal. In some embodiments, the relationship between the fly height and the pulse width is substantially linear. In some embodiments, the fly height calculation is carried out by DSP processor 424.

In some embodiments, the fly height calculation is carried out according to the equation:

$$FH = K_{nom} \frac{PW50_{measured}}{\text{Amplitude}_{measured}}$$

where $PW_{measured}$ is the pulse width of the read back signal measured by measurement circuit 108, $\text{Amplitude}_{measured}$ is the amplitude of the read back signal measured by measurement circuit 108, $K_{nom}$ is a constant computed at a nominal fly height and FH is the fly height of head 102 calculated by calculation circuit 112.

The above embodiments of the fly height measurement system in accordance with the present invention differ from prior art systems by allowing for dynamic fly height measurement inside a disc drive with sufficient precision and sensitivity to measure true real-time disc drive read-write head fly height performance without extraneous mechanical hardware.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the fill extent indicated by the broad general meaning of the terms in which the appended claims are expressed. For example, the particular elements may vary depending on the particular application for the disc storage system while maintaining substantially the same functionality without departing from the scope and spirit of the present invention. In addition, although the preferred embodiment described herein is directed to a fly height measurement scheme for a disc storage system, it will be appreciated by those skilled in the art that the teachings of the present invention can be applied to any other systems that, in general, include heads that return a read back signal, without departing from the scope and spirit of the present invention.

What is claimed is:

1. A system for measuring fly height of a head over a rotatable magnetic disc having a disc surface on which data is digitally stored by selectively polarizing portions of the disc surface into at least a first magnetic state or a second magnetic state, the system comprising:

a read back circuit coupled to the head, the read back circuit generating an electrical read back signal which contains pulses in response to the head encountering a transition between opposing magnetic states;

a measurement circuit electrically operably coupled to the read back circuit and configured to measure a pulse width and an amplitude of the read back signal; and a calculation circuit electrically operably coupled to the measurement circuit and configured to determine the fly height of the head based on the measured pulse width and amplitude of the read back signal.

2. The system of claim 1, wherein the measurement circuit further comprises:

a pulse width measurement circuit that measures the pulse width of the read back signal; and an amplitude measurement circuit that measures the amplitude of the readback circuit.

3. The system of claim 1, wherein the pulse width is measured at half a peak amplitude of the readback signal.

4. The system of claim 1, wherein the relationship between the fly height and the pulse width is substantially linear.

5. The system of claim 1, wherein the fly height is calculated in accordance with an equation:

$$FH = K_{nom} \frac{PW50_{measured}}{Amplitude_{measured}}$$

where $PW50_{measured}$ is the pulse width of the read back signal measured by the measurement circuit, $Amplitude_{measured}$ is the amplitude of the read back signal measured by the measurement circuit, $K_{nom}$ is a constant computed at a nominal fly height and FH is the fly height of the head calculated by the calculation circuit.

6. The system of claim 1, wherein the measurement circuit includes a comparator that compares the read back signal to a reference level, the reference level being a threshold at which the pulse width of the read back signal is to be measured.

7. The system of claim 1, wherein the measurement circuit includes a counter that increments a count at a constant clock time period when the read back signal is above a reference level.

8. The system of claim 7, wherein the pulse width is a product of the count and the constant clock time period.

9. The system of claim 1, wherein the measurement circuit includes a sample-hold circuit that provides a sampled read back signal.

10. The system of claim 9, wherein the measurement circuit includes a peak detector that holds a peak amplitude value from the sampled read back signal.

11. The system of claim 1, wherein the calculation circuit includes a DSP processor.

12. A disc storage system including a transducer head to read back data, wherein the same transducer head is used for measurement of fly height in the disc storage system using the system of claim 1.

13. A method of measuring fly height of a head over a rotatable magnetic disc having a disc surface on which data is digitally stored by selectively polarizing portions of the disc surface into at least a first magnetic state or a second magnetic state, with the head coupled to a read back circuit that generates an electrical read back signal which contains pulses in response to the head encountering a transition between magnetic states, the method comprising:

(a) measuring a pulse width and an amplitude of the read back signal; and (b) calculating the fly height of the head based on the measured pulse width and amplitude of the read back signal.

14. The method of claim 13, wherein measuring operation (a) comprises:

(a) (1) measuring the pulse is carried out with a pulse width measurement circuit; and (a) (2) measuring the amplitude is carried out with an amplitude measurement circuit.

15. The method of claim 13, wherein the pulse width in step (a) is measured at half a peak amplitude of the read back signal.

16. The method of claim 13, wherein the relationship between the fly height and the pulse width is substantially linear.

17. The method of claim 13, wherein the fly height calculation is carried out in accordance with an equation:

$$FH = K_{nom} \frac{PW50_{measured}}{Amplitude_{measured}}$$

where $PW50_{measured}$ is the pulse width of the read back signal measured by the measurement circuit, $Amplitude_{measured}$ is the amplitude of the read back signal measured by the measurement circuit, $K_{nom}$ is a constant computed at a nominal fly height and FH is the fly height of the head calculated by the calculation circuit.

18. The method of claim 13, wherein the calculating fly height operation (b) is carried out by a DSP processor.

19. A disc storage system implementing the method of claim 13.

20. A fly height measurement system comprising:

a head positioned over a rotatable magnetic disc having a disc surface on which data is digitally stored by selectively polarizing portions of the disc surface into at least a first magnetic state or a second magnetic state, with the head coupled to a read back circuit that generates an electrical read back signal which contains pulses in response to the head encountering a transition between magnetic states; and means for calculating the fly height of the head over the rotatable magnetic disc by measuring a pulse width and an amplitude of the read back signal and determining the fly height of the head based on the measured pulse width and amplitude of the read back signal.

* * * * *